April 6, 1954 L. E. PONSY 2,674,717
REGULATING DEVICE OF ELECTRIC MACHINES
Filed March 5, 1952 3 Sheets-Sheet 1
Fig.1.
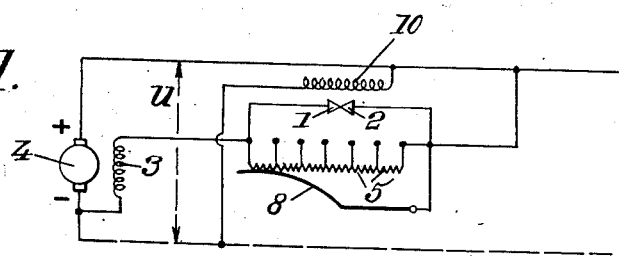
Fig.2.
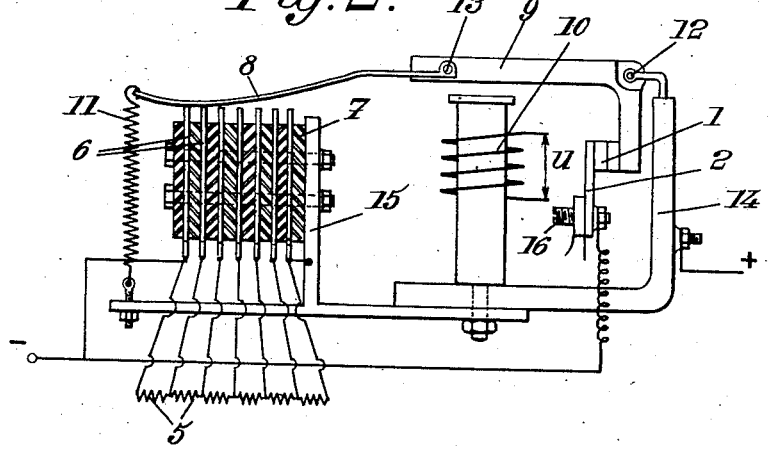
Fig.3. Fig.4.
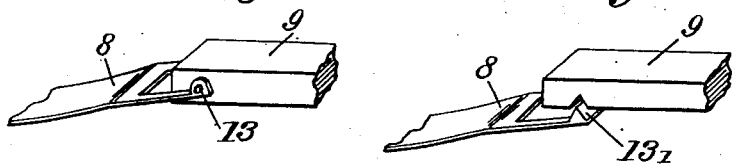
Fig.5. Fig.6.
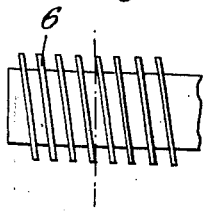 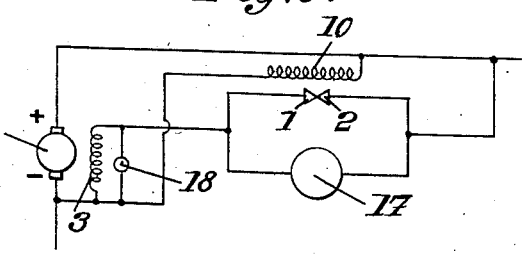
INVENTOR
LOUIS EMILE PONSY
BY
Bailey, Stephens & Huettig
ATTORNEYS April 6, 1954   L. E. PONSY   2,674,717
REGULATING DEVICE OF ELECTRIC MACHINES
Filed March 5, 1952   3 Sheets-Sheet 3

INVENTOR
LOUIS EMILE PONSY
BY
Bailey, Stephens & Huetty
ATTORNEYS

Patented Apr. 6, 1954

2,674,717

UNITED STATES PATENT OFFICE 2,674,717

REGULATING DEVICE OF ELECTRIC MACHINES

Louis Emile Ponsy, Clichy, France

Application March 5, 1952, Serial No. 274,859

Claims priority, application France February 25, 1947

2 Claims. (Cl. 323—66)

The present application, which is a continuation in part of my U. S. patent application Ser. No. 9,511, filed February 19, 1948, relates to devices for regulating electric machines, and more especially, although not exclusively, to devices of the vibrating contact type, that is to say including at least one contact operated by a relay controlled in response to variations of the voltage or other factor to be regulated, said contact being intended, when opened, for instance in response to a voltage rise, to insert into the circuit of the machine to be controlled a resistance which modifies the excitation of this machine.

The chief object of my invention is to provide a device of this type which is better adapted to meet the requirements of practice than those used for the same purpose up to the present time.

Preferred embodiments of my invention will be hereinafter described with reference to the accompanying drawings, given merely by way of example, and in which:

Fig. 1 diagrammatically shows an electric machine fitted with a regulating device according to my invention.

Fig. 2 separately shows this device in a more detailed manner.

Figs. 3 and 4 show, in perspective view, one of the elements of this device according to two different embodiments.

Fig. 5 shows, in plan view, a portion of this device made according to a modification.

Fig. 6 is a diagram of an electric machine fitted with a regulating device made according to another embodiment of my invention.

Figure 7:
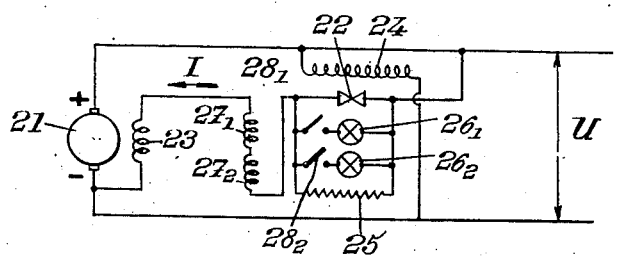
Figs. 7 to 10 are diagrammatical views of regulating devices made according to four other embodiments of the invention.

As diagrammatically shown by Fig. 1, my device includes at least two contacts 1—2, inserted in the circuit of the excitation means 3 of machine 4, these two contacts being subjected to the action of an electro-magnet 10 operated by the voltage U to be regulated.

A resistance 5 is connected across the terminals of contacts 1—2 so as to be brought into circuit when said contacts are moved away from each other under the effect of a voltage rise.

But instead of giving the resistance a fixed value, it is made variable and this in such manner that its ohmic value tends to increase when contacts 1—2 move away from each other.

I can thus obviate the known drawbacks of regulating devices of the type with which the present invention is concerned, to wit quick wear and tear of the contacts. This result is due to the fact that, owing to the above mentioned variations of said resistance, which is low when the contact is broken, the strain on the contact elemens is greatly reduced. Furthermore, the effects of self-induction, resulting from current breaking, are considerably attenuated, which reduces the parasitic perturbations transmitted to radio-electric plants.

Fig. 2 shows an embodiment of my invention, according to which resistance 5 is constituted by a multiplicity of elements connecting together plates 6 juxtaposed and separated from one another by insulating elements 7, the system thus constructed cooperating with a rolling contact such as 8 one end of which is connected to the armature 9 of an electro-magnet 10 subjected to the action of voltage U, while the other end of said contact is urged downwardly by spring 11.

Armature 9 pivots, for instance, at 12 and is rigid with contact 1, while the other contact 2 is carried by the frame.

Movable contact 8 is pivoted to armature 9 at 13, for instance through the intermediate of a hinge such as visible on Fig. 3, or merely through a knife edge 13₁ kept applied upon armature 9 under the effect of spring 11, or again through cardan-like means.

The electric circuits of Fig. 2 are similar to those of Fig. 1. Rolling of movable contact 8 on plates 6 has for its effect to short-circuit a variable number of sections 5 of the resistance. The circuit is supposed to be closed toward the positive terminal through movable contact 8, armature 9 and the magnetic frame of circuit 14. The support of plates 6 is made of a non-magnetic metal.

Advantageously, I provide means for regulating the operation of the apparatus constituted by plates 6 and variable contact 8, these means consisting for instance in a screw 16 for adjusting contact 2.

It may be advantageous to increase the continuity of rolling of variable contact 8 on plates 6, for which purpose it suffices, for instance, suitably to incline these plates with respect to the path of the variable contact, as visible on Fig. 5. In this case, said contact, before it leaves one of the plates, is already in contact with the next one.

Such a device has a very low inertia, much lower than that which would correspond to a rheostat of the ordinary type.

It is to be well understood that variation of the resistance might be obtained in any other way, through mechanical or other means.

In particular, and according to another feature of my invention, the variable resistance might be constituted by a device the ohmic value of which increases automatically as a function of the voltage across its terminals.

There are several devices of this kind, such in particular as filament lamps and in particular hydrogen iron filament lamps. It would therefore suffice, in order to carry out the invention, and as shown in Fig. 6, to place in shunt across the terminals of contacts 1—2, a lamp 17 of this kind (or possibly several ones combined in suitable manner) it being well understood that I might also use in combination the arrangement of Fig. 6 and that of Fig. 2, at least some of resistances 5 being constituted by lamps.

In the case of several lamps mounted in shunt or in series, their characteristics may be either identical or different in such manner as to permit of obtaining the optimum curve for variation of the ohmic resistance as a function of the applied voltage.

I may replace the hydrogen iron filament lamp or lamps by an alloy having a resistance which varies considerably when the temperature varies, as there exist many on the market, in particular under the designation of "fixamper." I might also combine a hydrogen iron filament lamp with resistances of this kind.

Anyway, it will be seen that these lamps 17 or other devices similar thereto have a resistance substantially equal to zero when contacts 1—2 start opening, this resistance increasing subsequently in a very short manner.

According to still another feature of my invention, regulation is either ensured or completed by placing across the terminals of inductors 3 a resistance without self-inductance, variable as above, in order to eliminate the self-induction current occurring upon breaking of contacts 1—2.

The results will be the better as the resistance inserted in shunt will be lower. However, it is not possible to go too far in this direction for, at low speeds, the sum of the currents flowing through the inductors and said resistances would be too high for a good working of the contacts 1—2 of the regulating device.

But if advantage is taken of the fact that the voltage across the terminals of the inductors, which was maximum at low speeds, tends to drop when the speed, due to the greater and greater voltage drop in the vibrating contact or other regulator, it will be seen that it is possible to solve the difficulty by making use, for the second resistance of a resistance which is variable automatically and in a direction such that its ohmic resistance increases when the voltage across the terminals increases.

In particular, I might use a hydrogen iron filament lamp 18. Its ohmic value is maximum at low speeds, for which the voltage across the inductor terminals is higher and the total current in contacts 1—2 can thus be kept at its value corresponding to these conditions.

On the contrary, for high speeds, the resistance of the lamp decreases, which involves a better working of the contacts as the speed increases and on the other hand the possibility of ensuring the operation of the regulating device with lower resistances 5 or 17.

According to still another feature of my invention, it may be advantageous to make use of a plurality of resistances arranged in shunt, these resistances being combined in such manner with suitable switch means that, according to the requirements of regulation, it is possible to bring into play either all or only some of these resistances.

The total resistance of the system is lowest when all the resistances are introduced. It increases as these resistances are being switched off successively, and any desired law of variation can be obtained, through the use of elementary resistances which may be either equal or different.

Figure 11:
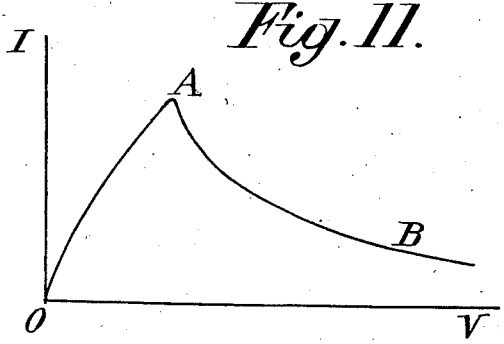
Fig. 11 is a diagram illustrating the working of these regulating devices.

Preferably, the resistance of the system, supposed to be used in connection with an electric generator, is minimum when the vibrating contacts open, and anyway at the beginning of the regulation operation, in particular when the generator is being started, that is to say when, the speed being still low, the excitation current must be high. The resistance of said system will be on the contrary caused to increase when, the working voltage value for the generator having been reached, it is necessary to reduce the excitation if the speed increases, as shown in Fig. 11 where I have shown, for instance for a shunt excitation machine, the curve of variation of the excitation current I as a function of the speed V of the machine, the current first rising up to a maximum A, to decrease subsequently from A toward B.

During the range of working conditions corresponding to AB, it will therefore be necessary, in a regulating device according to the invention, automatically to ensure, either by means of current I, or through the action of any other suitable factor, in particular of the voltage across the terminals of the excitation circuit, a gradual elimination of the elementary resistances with a view to increasing the total resistance of the whole as the excitation current I is decreasing, a result which can be obtained through the above mentioned switch means operated by any suitable relays (intensity relay, voltage relay, etc.).

The elementary resistances may be either ordinary resistances, or hydrogen iron filament lamps or other resistant elements having a resistance that increases with the voltage. Furthermore, the shunt arrangement is not an exclusive one but may be replaced by any equivalent wiring arrangements, in particular of the series-parallel type, provided that the resistance variation takes place according to a suitable law.

On the embodiment of Fig. 7, the regulating device of generator 21 essentially includes vibrating contacts 22 mounted for instance in series with inductor 23, and the opening and closing of which is controlled by a coil 24, for instance connected in shunt with the terminals of the generator. Of course, any other vibrating contact regulating arrangement, of the Tyrril or other type, might be used.

In shunt with said contacts 22, I mount several elementary resistances themselves in shunt, for instance a rheostatic resistance 25 and two (or more) variable resistance filament lamps $26_1$, $26_2$, said lamps being adapted to be brought into or out of circuit by relays $27_1$, $27_2$ controlling contacts $28_1$, $28_2$.

These relays, through which excitation currents $f$ are supposed to flow, are arranged in such manner that, for the maximum current, their armatures close the corresponding contacts $28_1$, $28_2$, which on the contrary are successively released when the current decreases as shown at AB, during the regulation period.

In other words, during the starting period OA, the resistances are inactive, since vibrating contacts 22 are closed. When the voltage across the terminals reaches the desired normal working value, contacts 22 open. But then, the excitation I being supposed to be at its maximum value, contacts $28_1$, $28_2$ are closed so that all the resistances are in circuit ($25_1$, $26_1$, $26_2$). The whole corresponds to a minimum resistance, which is quite suitable, both for regulation and also to reduce to a minimum sparks between contacts 22. If the speed increases, regulation takes place both under the action thereof and of the resistances due to the resulting reduction in current I, and, furthermore, to the supplementary action of relays $27_1$, $27_2$ under the effect of this current reduction. These relays successively switch off resistances $26_1$, $26_2$ to leave in circuit, at the end of the regulation period (in particular for the highest speeds), only resistance 25 the ohmic value of which is higher than that resulting from the connection thereof in shunt with the other resistances.

Figure 8:
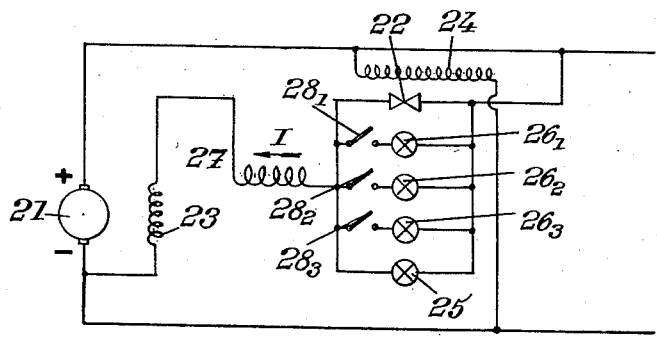

According to the embodiment of Fig. 8, I proceed similarly, but I have recourse to a single relay 27 which cooperates with several movable armatures which respectively control contacts $28_1$, $28_2$, etc., these armatures being subjected to the action of opposing elastic forces suitably adjusted to bring about a successive opening or closing of said contacts.

According to the embodiment of Fig. 9, I make use of a multiplicity of resistance $26_1$, $26_2$, $26_3$, etc., in combination with a rolling mechanical contactor, for instance of the kind above described with reference to Fig. 2, which contactor is constituted in particular by a rolling element 29 carrying contacts $28_1$, $28_2$ adapted to bear successively upon the respective contacts $30_1$, $30_2$ that are located opposite them.

Coil 27, through which it is still supposed that current I flows, operates this element 29 through any suitable means, in such manner as to close the whole of the contacts for the maximum value of the current and to release them when current I decreases, whereby the total resistance increases gradually as current I decreases.

Figure 9:
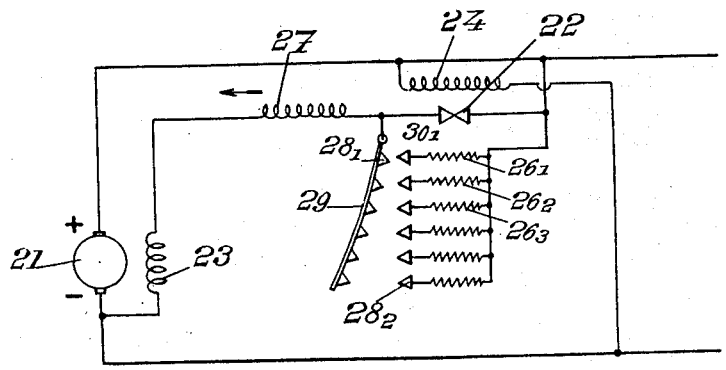
Figure 10:
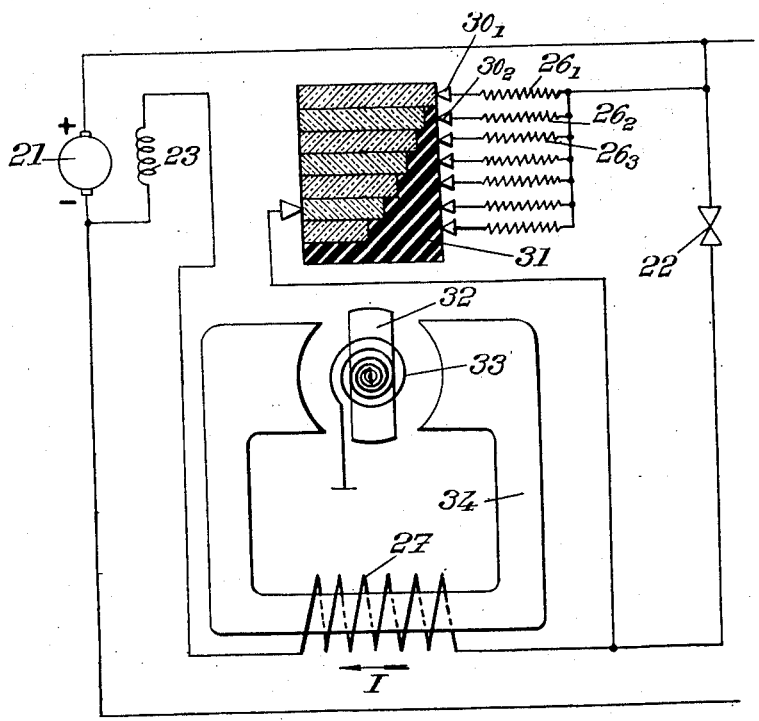

The embodiment of Fig. 10 is substantially similar to that illustrated by Fig. 9, but includes the use of a rotary contactor system 31, driven by an armature 32 mounted pivotally against the action of an opposing spring 33 in the magnetic field of an armature 34 excited by coil 27.

This rotary contactor 31 is arranged in the form of a drum collector, the conductor and insulating elements of which are arranged in stepped manner so as to ensure successive switching of contacts $30_1$, $30_2$, etc. It should be noted that the various relays that have been referred to, instead of being controlled by variation of the excitation intensity I, might be controlled by any other factors, in particular by the voltage at the terminals of the inductors.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A voltage regulator which comprises a regulating circuit section including shunt resistor means constituted by a set of electrical resistors in parallel with one another, at least some of said resistors being constituted by a filament lamp, switches for cutting off or inserting at will said resistors from or in said set, a single vibrating electrical contact in shunt across the whole of said set of resistors for periodically short-circuiting said set of resistors, relay means responsive to variations of the voltage to be regulated for causing said contact to vibrate at a rate depending upon the value of said voltage and relay means responsive to current variations in said regulating circuit section for cutting off said resistors successively as said current increases.

2. A voltage regulator which comprises a regulating circuit section including shunt resistor means constituted by a set of electrical resistors in parallel with one another, at least some of said resistors being constituted by a hydrogen iron filament lamp, switches for cutting off or inserting at will said resistors from or in said set, a single vibrating electrical contact in shunt across the whole of said set of resistors for periodically short-circuiting said set of resistors, relay means responsive to variations of the voltage to be regulated for causing said contact to vibrate at a rate depending upon the value of said voltage, and relay means responsive to current variations in said regulating circuit section for cutting off said resistors successively as said current increases.

References Cited in the file of this patent

UNITED STATES PATENTS

| Number | Name | Date |
|---|---|---|
| 1,503,214 | Sullivan | July 29, 1924 |